Oct. 16, 1934.  G. MacLEAN  1,976,956
TREATMENT OF LIQUIDS WITH GASES
Filed Nov. 18, 1932  2 Sheets-Sheet 1

INVENTOR-
Gordon MacLean
BY
Ramsey + Kent
his ATTORNEYS

Oct. 16, 1934.    G. MacLEAN    1,976,956
TREATMENT OF LIQUIDS WITH GASES
Filed Nov. 18, 1932    2 Sheets-Sheet 2

INVENTOR-
Gordon MacLean
BY
Ramsey & Kent
his ATTORNEYS

Patented Oct. 16, 1934

1,976,956

UNITED STATES PATENT OFFICE 1,976,956

TREATMENT OF LIQUIDS WITH GASES

Gordon MacLean, Flushing, N. Y., assignor to The Turbo-Mixer Corporation, New York, N. Y., a corporation of New York Application November 18, 1932, Serial No. 643,171

12 Claims. (Cl. 261—93)

This invention relates to the processing or treatment of liquids with gases. A liquid containing finely divided solid material in suspension is essentially a liquid and may be handled in the same manner as true liquids; and for convenience, I herein classify such materials as "liquids" without reference to whether the gas is intended to react with the liquid itself or with solids suspended in the liquid.

The invention is one of general applicability, being suitable for processing a wide variety of liquids with a wide variety of gases. I contemplate both continuous and batch procedure, batch procedure being shown by way of illustration. A particular application which will be referred to by way of illustration is the dehydrogenation of asphalt by oxidation. Air is blown or circulated through the asphalt and oxygen in the air combines with hydrogen in the asphalt to form water.

Various forms of apparatus are now in commercial use for oxidizing asphalt with air, and these accomplish the oxidation at various speeds and with various degrees of efficiency. With many of the asphalt blowing systems now in use, so little of the oxygen in the air is actually utilized that the exhaust gases show over eighteen percent oxygen. This, of course, means that the time required for completely treating the asphalt is quite long and that a large amount of power must be expended to pump through the asphalt the large amount of air required for complete treatment. A few asphalt blowing systems utilize more of the oxygen in the air, but so far as I am aware, the most efficient systems which have been used heretofore leave at least eight percent of oxygen in the exhaust gases. It may be pointed out that if substantially all of the oxygen in the air could be used in the process, considerably reduced total volume of air would be required for the treatment of a given quantity of asphalt. This would result in a saving in the power required to pump the air and would further result in a reduction of the time required for complete treatment.

A general object of the present invention is to reduce the cost and/or time of processing liquids with gases by obtaining more effective utilization of the gas.

A more specific object of the invention is to reduce the cost and time required for processing liquids with gases by producing a large area of contact between the gas and liquid with scrubbing action between the liquid and gas and a long length of travel of the gas through the liquid, all of which combine to effect more complete utilization of the gas in the process.

Another object of the invention is to provide commercially suitable apparatus which will speedily and economically treat liquids with gases.

Figure 1:
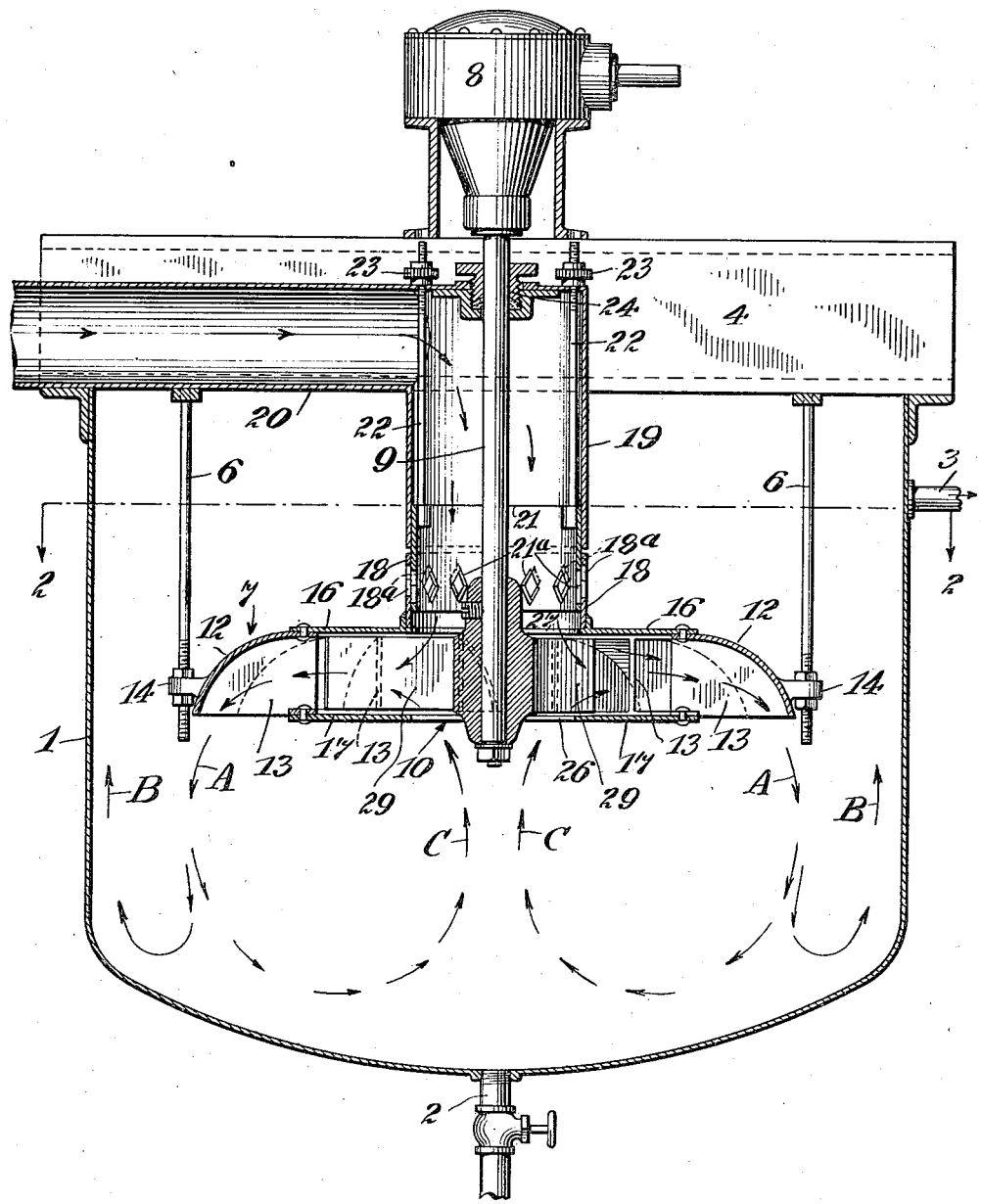
Fig. 1 is a vertical section showing illustrative apparatus embodying the present invention.
Figure 2:
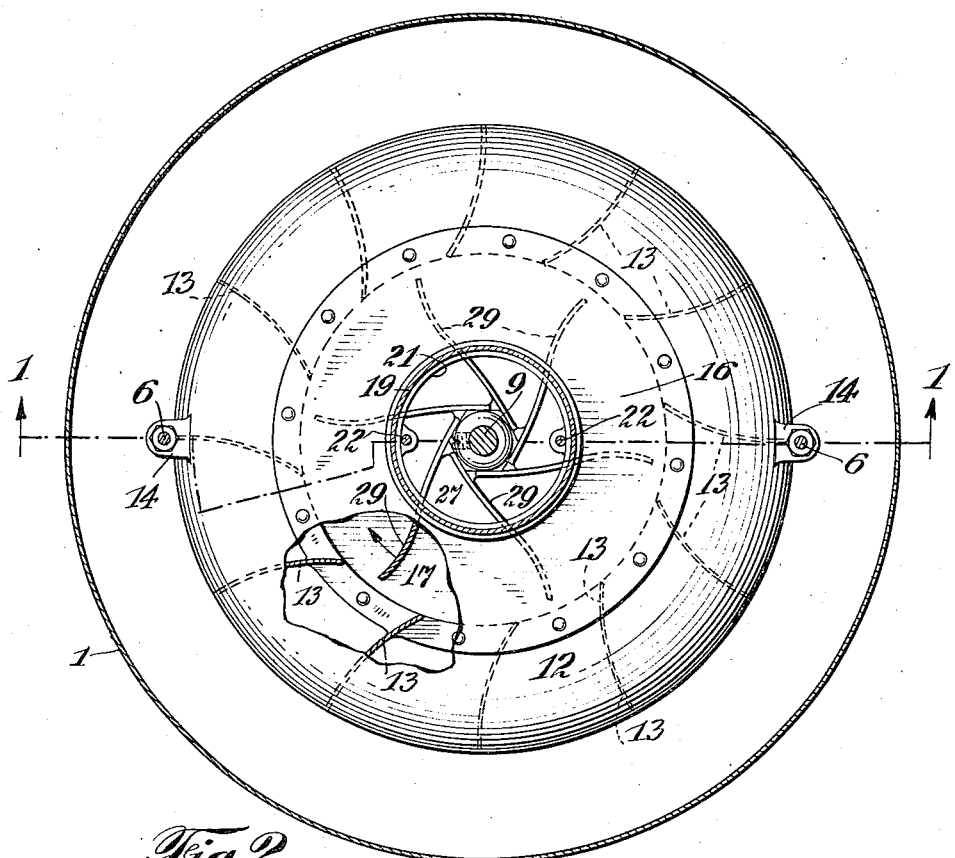
Fig. 2 is a horizontal section taken approximately on the line 2—2 of Fig. 1.
Figure 3:
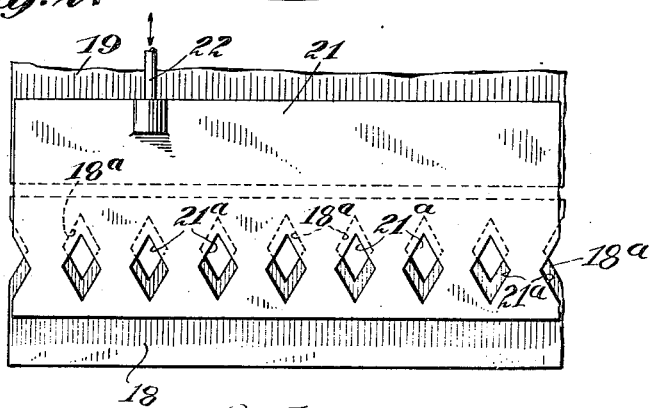
Fig. 3 is a development showing a portion of the gate valve for controlling liquid flow to the impeller shown in Figs. 1 and 2.

A tank 1 adapted to contain the liquid to be processed is provided with a suitable valved inlet and outlet pipe 2 and an overflow pipe 3. Across the top of the tank there are suitable cross beams or supporting members 4 (one shown) from which depend two or more rods 6 adapted to suspend a stationary flow controlling structure designated as a whole by 7. Supported on the cross members 4 is a conventional motor actuated drive unit 8 operative to rotate a depending vertical shaft 9 which carries a rotary impeller designated as a whole by 10. The impeller 10 may be of a well known duplex type adapted to draw in liquid from upper and lower zones in the tank, and discharge the liquid outwardly in a substantially horizontal plane.

The stationary structure 7 comprises a hood member 12 shaped much like the outer portion of an ordinary tin wash basin turned upside down. The hood member 12 may be cast of metal and integral with it there may be formed curved deflecting blades 13 which extend vertically downwardly from the hood 12. The hood may be provided with apertured bosses 14 adapted to be clamped as shown between nuts on the rods 6 to support the stationary structure 7 and to provide for its accurate vertical location with respect to the impeller. To the hood member 12, there is secured disc shaped apertured plates 16 and 17 providing upper and lower shrouding respectively for the impeller 10. Welded or otherwise attached to the shrouding plate 16 is a vertically extending tubular section 18 provided with a series of annularly arranged diamond shaped openings 18ª. Immediately above the tubular section 18 and spaced slightly therefrom is a second tubular section 19 which communicates with an air supply pipe 20 that may be opened to the atmosphere. Within the tubular sections 18 and 19, there is a vertically movable sleeve 21 having a series of diamond shaped openings 21ª corresponding to openings 18ª. By vertically moving said sleeve 21 the degree of communication between the tank and the interior of tube 18 may be varied. Such vertical movement may be effected through adjustment rods 22 attached to sleeve 21 and positioned by rotatable hand wheels 23. A stuffing gland 24 may be provided where shaft 9 enters the air tube.

In operation, the tank is filled with the liquid to be treated (e. g. asphalt) to a depth which will completely submerge the impeller and the holes 18ª in the tubular section 18. When the impeller is rotated, it draws liquid in through the bottom intake port 26 and it also draws in liquid which flows through the apertures 18ª, and passes down in a more or less annular stream through port 27. The flow of liquid through the impeller creates a low pressure zone adjacent the hub of the impeller. Thus, air is drawn in through the pipes 20 and 19 and is entrained with the liquid so that impeller blades 29 cause streams of mixed gas and liquid to flow outwardly in a substantially horizontal direction between the shrouding 16 and 17.

The impeller 10 may be of any suitable and known type, a very effective type being that known as the forward discharge type which is shown in the drawings. It will be seen that as the liquid and air enter the impeller, they are travelling in a substantially vertical direction. The mixture is immediately picked up by the blades and projected into outwardly flowing streams which follow a given path, gaining speed as the material approaches the tips of the impeller blades. The abrupt change of direction of flow of the mixed air and liquid as they enter the impeller causes the air to subdivide into relatively small bubbles which are extensively dispersed throughout the liquid; and the bubbles are distorted from a spherical form, thus increasing the area of contact between the bubbles and the liquid. Furthermore, there is produced a rubbing or scrubbing action between the bubbles and the liquid which facilitates the action of the air upon the liquid. The curved ends of the forward discharge impeller blades cause the outwardly travelling streams of mixed air and liquid to be projected tangentially forward as they leave the impeller, but the streams immediately strike stationary curved blades 13 and are thereby directed in a radial direction as far as the component of motion in a horizontal plane is concerned. This change of flow direction as the streams leave the impeller further distorts, subdivides and disperses the bubbles and produces additional scrubbing action between the air and liquid.

Also, as the mixed air and liquid leaves the impeller it is projected downwardly by the hood 12 in the path shown by the arrows A, thus giving the air bubbles a long path of travel through the liquid in the tank. As the currents approach the bottom of the tank, they will abate and subdivide, some of the air bubbles travelling to the top of the tank and escaping to the atmosphere or exhaust stack along the path indicated by the arrows B. A large portion of the air bubbles, however, will travel upwardly toward the center of the tank as indicated by the arrows C and reenter the impeller with the liquid through the lower intake port 26. Thus a large portion of the air will be passed through the impeller again and again, thereby effecting almost complete utilization of the oxygen of the air.

The optimum size of the lower intake port 26 depends upon the material being treated and the depth to which the impeller structure is submerged in the liquid. It is preferable to determine the optimum size by trial for any given material and operating condition. The size of the upper intake port 27 may be similarly determined, but the rate of liquid flow through this port and the amount of air which is sucked in through the pipes 20 and 19 may be regulated by varying the position of gate valve 21 and thereby regulating rate of liquid flow to the upper port 27. The construction shown is capable of sucking air to a considerable level below the liquid but if it be desired to utilize the impeller at a relatively great distance below the liquid surface, or if it does not suck enough air, the impeller suction can be augmented by a blower delivering the air (or other gas) to pipe 20.

It will be apparent that the time during which the average elemental volume of air is in contact with the liquid is very considerable due to the long air path through the liquid and the recirculation of the air through the impeller. This taken with the distortion of the air bubbles at various points and the scrubbing action between the air and liquid (which has already been referred to) results in almost complete utilization of the air, or other gas. For example, an actual installation of the present invention used to oxidize asphalt with air showed less than one percent of oxygen in the exhaust gas, as against eight to eighteen percent oxygen in the exhaust gas of other existing commercial systems. The fact that the oxygen in the air is so completely utilized makes it possible for the impeller itself to draw in as much air as will ordinarily be required. Thus a usual installation of the present invention saves the initial cost and the operating cost of separate air compressors or blowers. Accordingly, the system of the present invention is very simple and inexpensive to operate as compared to other existing systems in commercial installation.

The impeller and the stationary structure associated with it may be made of cast metal or may be fabricated from sheet metal parts welded or otherwise secured together. The metal selected for any given installation should be one not seriously affected by the gas or liquid to which it will be subjected. For many purposes iron and steel are suitable. For some classes of service, brass, bronze, or Monel metal are used. Also in some instances the impeller and other parts may be covered with rubber or other protective coating.

The invention may, of course, be embodied in forms other than the particular one disclosed. For example, various known types of impellers may be used instead of the particular one shown in the drawings; and in some instances the bottom shrouding 17 may be dispensed with, particularly if the impeller be of the type having a horizontal web extending annularly about the impeller hub between the upper and lower edges of the blades.

I claim:

1. Apparatus for treating liquids with gases comprising means to hold a body of liquid; means to continuously draw portions of the liquid from upper and lower zones in the main body and to a zone between said upper and lower zones, continuously mix gas with such portions and continuously form the mixture of gas and liquid into local streams of substantial length travelling substantially horizontally and separated from the main body of liquid; and means to abruptly change the direction of travel of said local streams and return them to the main body of liquid in a downward direction.

2. Apparatus for treating liquids with gases comprising a substantially horizontal rotary impeller having upper and lower centrally located liquid intake ports and outwardly extending blades; a gas conduit leading to and discharging at a point adjacent at least one of said intake ports whereby the gas is mixed with liquid entering the impeller; and stationary deflector blades surrounding the impeller, said stationary blades being effective to change the direction of flow of the mixed gas and liquid discharged by the impeller.

3. Apparatus for treating liquids with gases comprising a substantially horizontal rotary impeller having upper and lower centrally located liquid intake ports and outwardly extending blades, a gas conduit leading to a point adjacent at least one of said intake ports whereby the gas is mixed with liquid entering the impeller and the impeller discharges in a substantially horizontal plane streams of mixed gas and liquid, substantially vertical stationary deflector blades surrounding the impeller, and hood means also surrounding the impeller to direct downwardly the streams discharged by the impeller.

4. Apparatus for treating liquids with gases comprising a substantially horizontal rotary impeller having upper and lower centrally located liquid intake ports and outwardly extending blades, a gas conduit leading to a point adjacent at least one of said intake ports whereby the gas is mixed with liquid entering the impeller and the impeller discharges in a substantially horizontal plane streams of mixed gas and liquid, and hood means surrounding the impeller to direct downwardly the streams discharged by the impeller.

5. Apparatus for treating liquids with gases comprising a tank for liquid; a rotary bladed impeller within the tank; shrouding adjacent the edges of the impeller blades, the shrouding having intake openings therein on each side of the impeller permitting duplex liquid flow from the tank into the impeller; and a conduit to conduct gas to a point adjacent one of said intake ports and there bring it into contact with the liquid entering the impeller.

6. Apparatus for treating liquids with gases comprising a tank for liquid; a rotary bladed impeller within the tank; shrouding adjacent the edges of the impeller blades, the shrouding having intake openings therein on each side of the impeller permitting duplex liquid flow from the tank into the impeller; a conduit to conduct gas to a point adjacent one of said intake ports and there bring it into contact with the liquid entering the impeller, and stationary deflector blades positioned about the periphery of the impeller.

7. Apparatus for treating liquids with gases comprising a tank for liquid; a rotary bladed impeller within the tank; shrouding adjacent the edges of the impeller blades, the shrouding having intake openings therein on each side of the impeller permitting duplex liquid flow from the tank into the impeller; a conduit to conduct gas to a point adjacent one of said intake ports and there bring it into contact with the liquid entering the impeller; stationary deflector blades positioned about the periphery of the impeller; and a hood also about the periphery of the impeller blades to direct downwardly the discharge from the impeller.

8. Apparatus for treating liquids with gases comprising a tank for liquid; a rotary bladed impeller within the tank, the impeller discharging outwardly with respect to its axis of rotation and shrouding adjacent the edges of the impeller blades; the shrouding having intake ports therein on the opposite sides of the impeller, at least one of said ports being open to liquid in the tank; and a gas conduit leading into the tank and discharging adjacent at least one of said ports whereby gas is mixed with the liquid entering the impeller.

9. Apparatus for treating liquids with gases comprising a tank for liquid; a rotary bladed impeller within the tank; shrouding adjacent the edges of the impeller blades, the shrouding having intake ports therein on the opposite sides of the impeller, at least one of said intake ports being open to the liquid in the tank; a conduit to conduct gas to a point adjacent one of said intake ports and there bring it into contact with the liquid entering the impeller; and stationary deflector blades positioned about the periphery of the impeller.

10. Apparatus for treating liquids with gases comprising a tank for liquid; a rotary bladed impeller within the tank; shrouding adjacent the edges of the impeller blades, the shouding having intake ports therein on each side of the impeller, at least one of said intake ports being open to the liquid in the tank; a conduit to conduct gas to a point adjacent one of said intake ports and there bring it into contact with the liquid entering the impeller, stationary deflector blades positioned about the periphery of the impeller; and a hood also about the periphery of the impeller blades to direct downwardly the discharge from the impeller.

11. Apparatus for treating liquids with gases comprising a tank for liquid; an impeller rotatable within the tank on a substantially vertical axis, the impeller having blades operative to direct liquid outwardly in a substantially horizontal plane, there being shrouding adjacent the upper edges of the blades and the impeller being open top and bottom to receive liquid above and below from the tank; gas conducting means positioned to effect the mixture of gas with the liquid handled by the impeller; and downwardly inclined hood means positioned circumferentially of the impeller to deflect downwardly the mixture of gas and liquid discharged by the impeller.

12. Apparatus for treating liquids with gases comprising a tank for liquid; an impeller rotatable within the tank on a substantially vertical axis, the impeller having blades operative to direct liquid outwardly in a substantially horizontal plane, there being shrouding adjacent the upper edges of the blades and the impeller being open top and bottom to receive liquid above and below from the tank; gas conducting means positioned to effect the mixture of gas with the liquid handled by the impeller; downwardly inclined hood means positioned circumferentially of the impeller to deflect downwardly the mixture of gas and liquid discharged by the impeller; and stationary substantially vertical blades associated with said hood means and positioned in the path of the mixture discharged by said impeller.

GORDON MacLEAN.